(12) United States Patent
Barefoot et al.

(10) Patent No.: US 11,904,977 B2
(45) Date of Patent: Feb. 20, 2024

(54) COMPENSATOR

(71) Applicant: Eko Sport, Inc., Grand Junction, CO (US)

(72) Inventors: Darek C. Barefoot, Grand Junction, CO (US); Scott Winans, Grand Junction, CO (US); Timothy A. Fry, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 670 days.

(21) Appl. No.: 17/064,180

(22) Filed: Oct. 6, 2020

(65) Prior Publication Data

US 2021/0107590 A1    Apr. 15, 2021

Related U.S. Application Data

(60) Provisional application No. 62/913,789, filed on Oct. 11, 2019.

(51) Int. Cl.
| | | |
|---|---|---|
| *B62K 25/04* | (2006.01) | |
| *B62K 25/08* | (2006.01) | |
| *F16F 13/00* | (2006.01) | |
| *B62K 21/02* | (2006.01) | |

(52) U.S. Cl.
CPC ............ *B62K 25/04* (2013.01); *F16F 13/007* (2013.01); *B62K 21/02* (2013.01); *B62K 25/08* (2013.01); *B62K 2201/04* (2013.01); *B62K 2201/08* (2013.01); *F16F 2232/08* (2013.01)

(58) Field of Classification Search
CPC .... B62K 25/04; B62K 25/08; B62K 2201/04; B62K 2201/08; B62K 21/02; F16F 13/007; F16F 2232/08
See application file for complete search history.

(56) References Cited

U.S. PATENT DOCUMENTS

| | | | |
|---|---|---|---|
| 2,352,351 A | | 6/1944 | Thornhill |
| 2,357,278 A | * | 8/1944 | O'Connor ................. F16F 9/08 |
| | | | 188/320 |
| 2,379,388 A | | 6/1945 | Thornhill |
| 3,173,671 A | | 3/1965 | Broadwell |
| 3,552,766 A | | 1/1971 | Willich |
| 3,625,321 A | * | 12/1971 | Lutz ....................... B60G 17/04 |
| | | | 188/315 |
| 3,944,197 A | * | 3/1976 | Dachicourt ............... F16F 9/52 |
| | | | 267/64.19 |
| 3,945,663 A | | 3/1976 | Duckett |
| 4,132,395 A | * | 1/1979 | Fox, Jr. ................... F16F 9/088 |
| | | | 188/269 |
| 4,271,938 A | * | 6/1981 | Berger ...................... F16F 9/19 |
| | | | 188/282.7 |
| 4,560,042 A | | 12/1985 | Sell et al. |

(Continued)

*Primary Examiner* — Robert A. Siconolfi
*Assistant Examiner* — James K Hsiao
(74) *Attorney, Agent, or Firm* — Jason H. Foster; Kremblas & Foster (57) ABSTRACT

A shock absorber includes a compensator and a variable volume chamber. The compensator contains a compressible fluid and the variable volume chamber contains a substantially incompressible fluid. During a compression stroke, an increase in the volume of the incompressible fluid in the variable volume chamber compresses the compensator and thereby increases the available volume in the variable volume chamber.

20 Claims, 9 Drawing Sheets

(56) References Cited

U.S. PATENT DOCUMENTS

| | | | | |
|---|---|---|---|---|
| 4,614,255 A * | 9/1986 | Morita | ............... | F16F 9/088 |
| | | | | 188/315 |
| 4,664,234 A | 5/1987 | Wight et al. | | |
| 4,700,815 A | 10/1987 | Persicke et al. | | |
| 4,880,213 A | 11/1989 | Shinbori et al. | | |
| 5,376,135 A * | 12/1994 | Aulie | ............... | A61F 2/68 |
| | | | | 188/322.19 |
| 5,398,786 A * | 3/1995 | Mintgen | ............... | F16F 9/3482 |
| | | | | 188/282.5 |
| 5,449,155 A | 9/1995 | Mack | | |
| 5,501,434 A * | 3/1996 | McGuire | ............... | F16F 13/24 |
| | | | | 416/140 |
| 5,743,547 A | 4/1998 | Voss et al. | | |
| 5,848,675 A * | 12/1998 | Gonzalez | ............... | F16F 9/06 |
| | | | | 188/322.22 |
| 5,884,733 A * | 3/1999 | McAndrews | ............... | B62K 25/04 |
| | | | | 188/276 |
| 5,971,117 A * | 10/1999 | Grundei | ............... | F16F 9/346 |
| | | | | 188/322.19 |
| 6,042,091 A * | 3/2000 | Marzocchi | ............... | B60G 15/061 |
| | | | | 267/221 |
| 6,450,307 B2 | 9/2002 | Lutz | | |
| 6,464,212 B2 | 10/2002 | Lutz | | |
| 6,776,269 B1 * | 8/2004 | Schel | ............... | F16F 9/346 |
| | | | | 188/316 |
| 7,055,319 B1 | 6/2006 | Luca | | |
| 7,066,310 B2 * | 6/2006 | Mintgen | ............... | E05C 17/305 |
| | | | | 188/322.22 |
| 7,690,666 B2 | 4/2010 | McAndrews | | |
| 7,921,974 B2 | 4/2011 | Becker | | |
| 8,123,006 B1 | 2/2012 | Schroeder | | |
| 8,235,187 B2 * | 8/2012 | Murakami | ............... | F16F 9/466 |
| | | | | 188/289 |
| 8,245,823 B2 * | 8/2012 | Zeissner | ............... | F16F 1/328 |
| | | | | 188/322.22 |
| 8,261,895 B2 * | 9/2012 | Murakami | ............... | F16F 9/461 |
| | | | | 280/124.179 |
| 8,276,719 B2 | 10/2012 | Trujillo et al. | | |
| 8,336,683 B2 | 12/2012 | McAndrews et al. | | |
| 8,342,302 B2 | 1/2013 | McAndrews et al. | | |
| 8,342,488 B2 | 1/2013 | Becker | | |
| 8,511,445 B2 | 8/2013 | McAndrews et al. | | |
| 8,672,106 B2 | 3/2014 | Laird et al. | | |
| 8,794,402 B2 * | 8/2014 | Ruan | ............... | B60N 2/544 |
| | | | | 267/140.2 |
| 8,863,918 B2 * | 10/2014 | Murakami | ............... | F16F 9/064 |
| | | | | 188/269 |
| 8,960,389 B2 | 2/2015 | McAndrews | | |
| 9,175,740 B2 * | 11/2015 | Cultraro | ............... | F16F 9/088 |
| 9,194,456 B2 | 11/2015 | Laird et al. | | |
| 9,758,210 B2 | 9/2017 | Pye et al. | | |
| 9,855,812 B2 * | 1/2018 | Galasso | ............... | F16F 9/0218 |
| 9,874,263 B2 * | 1/2018 | Noguchi | ............... | F16F 9/585 |
| 10,180,171 B2 | 1/2019 | Laird et al. | | |
| 10,731,724 B2 | 8/2020 | Laird et al. | | |
| 2007/0080515 A1 * | 4/2007 | McAndrews | ............... | B62K 25/08 |
| | | | | 280/276 |
| 2010/0219569 A1 * | 9/2010 | Mori | ............... | B62K 25/08 |
| | | | | 267/127 |
| 2011/0215551 A1 * | 9/2011 | Galasso | ............... | F16F 13/00 |
| | | | | 267/64.11 |
| 2013/0105259 A1 * | 5/2013 | Murakami | ............... | F16F 9/064 |
| | | | | 188/269 |
| 2014/0077465 A1 * | 3/2014 | Murakami | ............... | B60G 17/0272 |
| | | | | 280/6.157 |
| 2014/0084555 A1 * | 3/2014 | Murakami | ............... | B62K 25/00 |
| | | | | 280/5.514 |
| 2016/0263958 A1 * | 9/2016 | Murakami | ............... | F16F 15/002 |
| 2016/0369862 A1 * | 12/2016 | Miwa | ............... | F16F 9/465 |
| 2017/0334504 A1 | 11/2017 | Pye et al. | | |
| 2020/0148301 A1 * | 5/2020 | Ishihara | ............... | B62K 25/08 |
| 2021/0010556 A1 | 1/2021 | Laird et al. | | |

\* cited by examiner

COMPENSATOR

CROSS-REFERENCES TO RELATED APPLICATIONS

This application claims the benefit of U.S. Provisional Application No. 62/913,789 filed Oct. 11, 2019. The prior application is hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present disclosure relates to a suspension system and for a bicycle. More specifically, the present design relates to a suspension system for a bicycle, where a gas or other compressible fluid is used as a spring and an incompressible fluid is used as a damping medium. Further, the present design relates to a compensator positioned away from an end of the suspension in a damper structure.

In many dampers that include an incompressible fluid, the pressure of the fluid may increase during a compression portion of a stroke and may decrease during a rebound portion of a stroke. In such structures, it may be desirable to include a compensator chamber at one end of a suspension system filled with air or another gas with a floating piston between the damping chamber and the compensator chamber. Because the compressible fluid is compressible, the compressible fluid always expands to fill the compensator chamber, and the position of the floating piston moves based on the relative pressure in the damping chamber and the compensator chamber. In this way, the use of a compensator chamber reduces the risk of a vacuum developing in the damping chamber and reduces the risk of cavitation.

However, in many structures, including a compensator chamber at one end of the shock absorber may be undesirable for a variety of reasons. In some configurations, the end of the shock absorber may include a variety of structures that separate the overall damping structure into a variety of chambers. In such a structure, passageways may allow fluid flow between the chambers. Inclusion of a compensator chamber would create difficulties in manufacture and assembly, particularly because it would be difficult to ensure that the floating piston would not pass one of the passageways, thereby causing the air and incompressible fluid to mix. In other configurations, the diameter of the suspension system and damping chamber may be too narrow to permit the inclusion of enough air in a typically structured compensator chamber.

Accordingly, in many embodiments, it may be desirable to include a compensator that is located remote from an end of the suspension structure. It may be desirable for the compensator to be placed adjacent a closed face of one of the ends of the suspension, and it may be desirable for the compensator to substantially surround a shaft attached to the other of the ends of the suspension. Such embodiments may improve manufacturability and damper performance.

BRIEF SUMMARY OF THE INVENTION

The present disclosure is directed to a shock absorber for a bicycle having various desirable features.

In one embodiment, a shock absorber may include a first end, a second end, a first piston, and a compensator. The first end may be configured to be mounted to a bicycle. The second end may be configured to be mounted to a bicycle and may comprise a first tube that may at least partially define a damping chamber. The second end may terminate in an end face. The first piston may be secured in a substantially fixed position to the first end with a first shaft. The first piston may be configured to move within the second end. The compensator may be positioned between the first piston and the end face. Movement of the compensator may be substantially independent of movement of the first piston, the first end and the first tube. The compensator may be substantially surrounded by a substantially incompressible fluid. The compensator may be configured to retain a compressible fluid. The compensator may at least partially surround the first shaft.

The compensator may be an annular bladder. The compensator may be at least one foam that is capable of retaining the compressible fluid.

At least one portion of the compensator may be configured to compress upon an increase in pressure on the compensator from the substantially incompressible fluid. At least one portion of the end face may be configured to move relative to the remainder of the second end.

The shock absorber may further include a spring attached to the first end. The first end may at least partially define a gas chamber containing gas. The first shaft and the compensator may be configured to move relative to one another.

In another embodiment, a shock absorber may include a first end, a second end, a first piston, a first tube, a second tube and a variable volume chamber. The first end may be configured to be mounted to a bicycle. The second end may be configured to be mounted to a bicycle and may include the first tube. The first tube may at least partially define a damping chamber. The second end may terminate in an end face. The first piston may be secured in substantially fixed position to the first end with a first shaft. The first piston may be configured to move within the first tube. The second tube may be positioned within the first tube. The variable volume chamber may be within the first tube and may be at least partially defined by the end face, the first shaft, and the second tube. An effective volume of the variable volume chamber may be variable.

A compensator may be positioned within the variable volume chamber. The compensator may be an annular bladder. The compensator may be at least one foam that is capable of retaining a compressible fluid. The variability of the volume of the variable volume chamber may be substantially defined by variability in the volume of the compensator. At least one portion of the compensator may be configured to compress upon an increase in pressure on the compensator. At least one portion of the end face may be configured to move relative to the remainder of the second end.

The compensator may be configured to move substantially independently of the first end, the first tube, and the first piston. The compensator may at least partially surround the first shaft. The compensator and the first shaft may be configured to move relative to one another.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object further from the vertical centerplane of the bicycle. In addition, the terms "bicycle" and "bike" are used herein interchangeably. A person having ordinary skill in the art will understand that if something is referred to as one, it can refer to the other.

The present device relates to a suspension system for a bicycle. The illustrations herein do not show the remainder of the bicycle structure. However, an ordinary design will fully understand how the structures described herein may be incorporated into a bicycle. In the illustrated embodiments, it will be understood by a person having ordinary skill in the art that one of the ends of the shock absorber will be attached to a bicycle in one location, such as being secure to the frame of a bicycle, and the other end of the shock absorber will be attached to a bicycle in another location, such as being attached to a wheel of a bicycle. Any conventional attachment structure may be used, and a person having ordinary skill in the art is able to modify the illustrated attachment structure, such as conventional eyes, for any other attachment structure that the designer deems desirable in a particular application.

The disclosed embodiments can be used in shock absorbers having a variety of characteristics. The illustrated embodiments are shown in combination with other elements of a shock absorber that will not be discussed in detail. In some embodiments, a gas chamber 104 may be substantially filled with a compressible gas or compressible fluid, and the gas chamber 104 may be a compression chamber or an air spring chamber. In the present disclosure, the term "compressible fluid" may include any compressible fluid, but the term refers particularly to a compressible gas. The compressible gas may include air, nitrogen, carbon dioxide, argon, or any other compressible fluid that is used or may be used by designers in the context of shock absorbers. If different parts of a shock absorber are filled with a compressible fluid, they may be filled with the same compressible fluid or different compressible fluids. When the term "gas" is used, it is understood to refer to a compressible gas falling within the terms of the compressible fluid. In some embodiments, a damping chamber 108 may be substantially filled with a substantially incompressible fluid. The details of the structure and action of the various parts of the gas chamber 104 and the damping chamber 108 may be substantially the same as those disclosed in U.S. provisional patent application No. 61/869,095, U.S. Pat. Nos. 9,731,574, 9,981,712 and 10,156,279, U.S. Patent Application Publication No. 2018/0236838, and U.S. patent application Ser. No. 16/556,553, the disclosures of which are incorporated herein by reference and not otherwise disclosed in detail.

In a first embodiment shown in FIGS. 1-7, a shock absorber 100 may include a first end 102 at least partially defining a gas chamber 104. A second end 105 may include a first tube 106, that may at least partially define the damping chamber 108. The first tube 106 may be configured to telescopically interfit with the first end 102. A first piston 110 may secured in substantially fixed position to the first end 102 with a first shaft 112. The first piston 110 may be configured to move within the first tube 106. The second end 105 may terminate in an end face 114, and in some embodiments, such as the illustrated embodiment, where the first end 102 includes a gas chamber 104, the end face 114 may be a second piston. The first shaft 112 may pass through the end face 114, and one or more seals may be incorporated in or around the end face 114 and may also contact the first shaft 112 to minimize the passage of any fluid through the end face 114 through the aperture 115 made for the first shaft 112. In some embodiments, the end face 114 may be a simple structure, and in other embodiments, such as the one shown, the end face 114 may incorporate multiple conventional structures.

Figure 1:
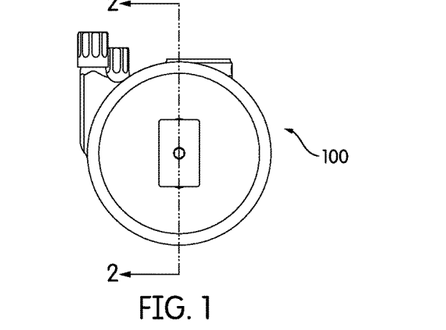
FIG. 1 is a top view of one embodiment of a shock absorber according to the disclosure.
Figure 2:
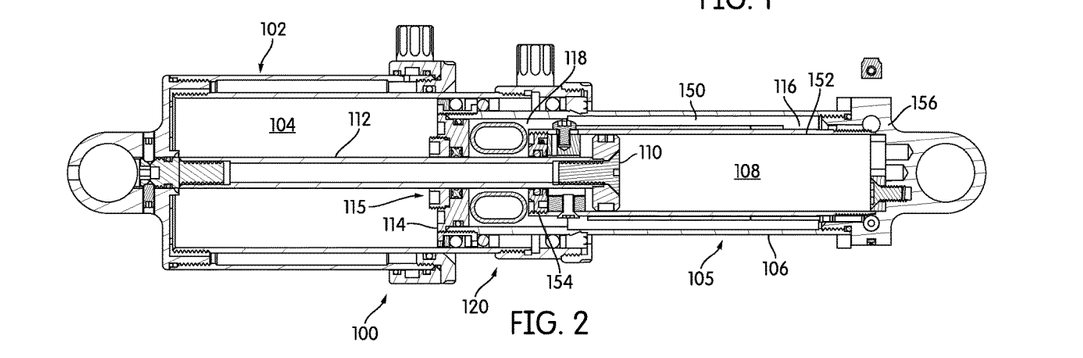
FIG. 2 is a sectional view of the shock absorber according to FIG. 1 taken along line 2-2 and showing the shock absorber in an extended position.
Figure 3:
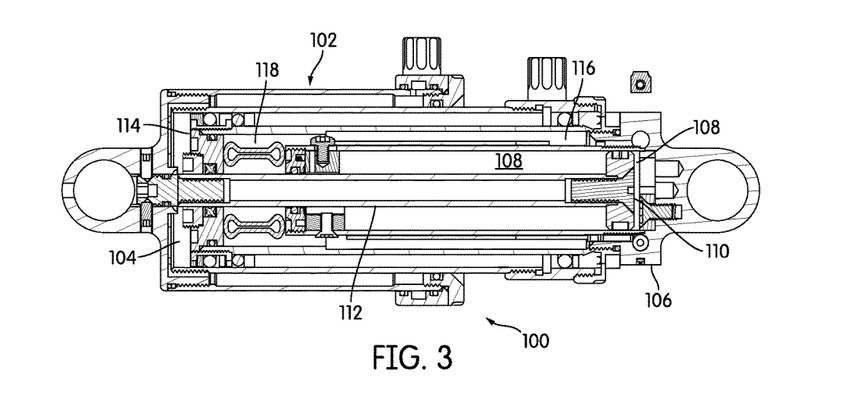
FIG. 3 is a sectional view of the shock absorber according to FIG. 1 taken along line 2-2 and showing the shock absorber in a compressed position.
Figure 4:
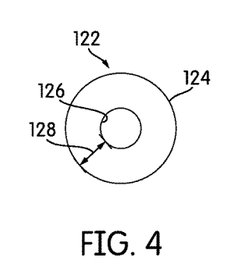
FIG. 4 is a top view of a first embodiment of a compensator.
Figure 5:
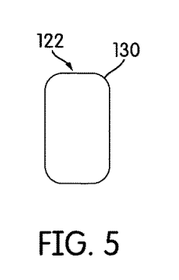
FIG. 5 is a side view of the embodiment of FIG. 4.

A compensator 120 may be positioned in a compensator chamber 118 between the first piston 110 and the end face 114. The compensator 120 may be positioned within the shock absorber 100 without being secured to any other structures within the shock absorber 100. Accordingly, movement of the compensator 120 within the shock absorber 100 may be substantially independent of movement of the first piston 110, the end face 114, the first end 102 and the first tube 106.

Figure 6:
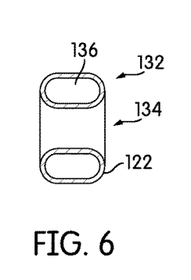
FIG. 6 is a sectional view of the embodiment of FIG. 4 taken along line 2-2 of FIG. 1.
Figure 7:
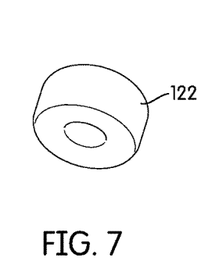
FIG. 7 is a perspective view of the embodiment of FIG. 4.
Figure 8:
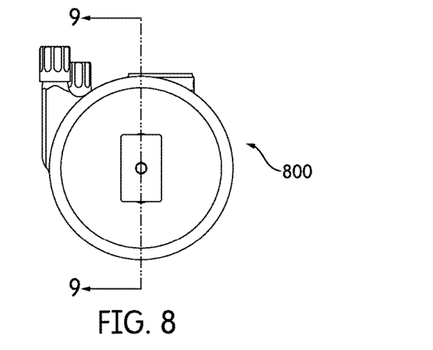
FIG. 8 is a top view of another embodiment of a shock absorber according to the disclosure.

The compensator 120 may also be substantially surrounded by the substantially incompressible fluid. As shown in the embodiment of FIGS. 1-7, the compensator 120 may be an annular bladder 122 that may be filled with and may be configured to retain a compressible fluid. The annular bladder 122 may be formed from rubber, polyurethane, or another resilient material that is able to maintain the compressible fluid within the annular bladder 122 separate from the substantially incompressible fluid in the compensator chamber 118 that substantially surrounds the annular bladder 122. For ease of manufacturing and consistency of the compensation function, the annular bladder 122 may be generally round on its outer circumference 124 and on its inner circumference 126 and may have a substantially continuous thickness 128 over the entire circumference. In many embodiments, the edges 130 of the annular bladder 122 may be rounded, so that the cross section of the annular bladder 122 shown in FIG. 6 is oval, as at 132. In other embodiments, the edges can be squared off, the shape of the bladder may be more irregular, or a plurality of smaller bladders may be used instead of the annular bladder shown in the FIGS. In many embodiments, the annular bladder 122 may be configured to at least partially or substantially surround the shaft 112 attached to the first end 102. In the equilibrium position shown in FIG. 2, the relative pressure between the compressible fluid within the compensator 120 and the substantially incompressible fluid outside the compensator 120 results in a bladder 122 that is substantially non-deformed. In other embodiments, there may be a preload applied in some manner, such that the compensator 120 is deformed due to a higher relative pressure of either the substantially incompressible fluid or the compressible fluid. In many embodiments, it may be desirable for pressure of the substantially incompressible fluid to at least slightly deform the compensator 120 inwardly (to partially compress it towards a shape like that shown in FIG. 3). A designer will be able to configure the bladder and to determine an appropriate relative pressure of the compressible fluid within the bladder 122 and the pressure of the substantially incompressible fluid outside the bladder 122 to provide an appropriate level of compensation.

During compression and rebound strokes, the first piston 110 may move within the damping chamber 108. During the compression stroke, the first piston 110 may move into the damping chamber 108 (in a direction towards the right in the orientation of FIGS. 2 and 3). The position of the various parts of the shock absorber 100 in a fully compressed position may be best seen in FIG. 3. The substantially incompressible fluid may then flow through a valving system and into an annular passageway 116. The substantially incompressible fluid may then move into the compensator chamber 118 that may substantially surround the compensator 120. During the compression stroke, the pressure from the substantially incompressible fluid on the compensator 120 may cause the compensator 120 to change in shape and size. During the compression stroke, when the pressure of the substantially incompressible fluid on the outside 134 of the bladder 122 exceeds the pressure of the compressible fluid on the inside 136 of the bladder 122, the pressure of the substantially incompressible fluid may compress the compressible fluid on the inside of the bladder 122 and also deform the bladder 122. In some embodiments, the compensator 120 may be configured to compress longitudinally upon an increase in pressure on the compensator 120 from the substantially incompressible fluid. In some embodiments, the compensator 120 may be configured to compress radially upon an increase in pressure on the compensator 120 from the substantially incompressible fluid. In some embodiments, the compensator 120 may be configured to compress both longitudinally and radially upon an increase in pressure on the compensator 120 from the substantially incompressible fluid. One example of the configuration of the compensator 120 in a compressed form may be seen in FIG. 3. When the rebound stroke begins and the pressure on the compensator 120 decreases, the bladder 122 may rebound to its original position. In some embodiments, pressure from the compressible fluid within the bladder 122 may deform the bladder 122 outwardly radially, longitudinally, or both, before returning to the equilibrium position and shape shown in FIG. 2, to minimize cavitation and maintain an appropriate pressure within the damping chamber 108.

The shock absorber 100 may further include a second tube 152 within the first tube 106. The second tube 152 may extend from one end cap 156 of the first tube 106 and may be substantially concentric with the first tube 106. The second tube 152 may terminate with a second tube end cap 154. The first piston 110 may be configured to reciprocate within the second tube 152 within the first tube 106.

The shock absorber 100 may also include a variable volume chamber 150 within the second tube 106. The variable volume chamber 150 may be at least partially defined by the end face 114, the first shaft 112, the second tube 152, and the compensator 120. The variable volume chamber 150 may include the annular chamber 116, the compensator chamber 118 and any other chambers that are in open fluid communication with either of those chambers. Because the compensator 120 may be positioned within and may help to define the volume of the variable volume chamber 150, and because the compensator 120 may be configured to be compressible when the incompressible fluid flows into the variable volume chamber 150 during a compression portion of the stroke, the effective volume of the variable volume chamber 150 may increase when the compensator 120 compresses. During the rebound portion of the stroke, the compensator 120 may return to an uncompressed configuration or temporarily expand to a configuration having an increased volume, thereby decreasing the effective volume of the variable volume chamber 150. Therefore, the effective volume of the variable volume chamber 150 is variable.

In a second embodiment shown in FIGS. 8-13, a shock absorber 800 may include a first end 802 at least partially defining a gas chamber 804, which may be a gas spring chamber as illustrated. A second end 805 may comprise a first tube 806 that may at least partially define a damping chamber 808. The first tube 806 may be configured to telescopically interfit with the first end 802. A first piston 810 may secured in substantially fixed position to the first end 802 with a first shaft 812. The first piston 810 may be configured to move within the first tube 806. The second end 805 may terminate in an end face 814, and in some embodiments, such as the illustrated embodiment, where the first end 802 includes a gas chamber 804, the end face 814 may be a second piston. The first shaft 812 may pass through the end face 814, and one or more seals may be incorporated in or around the end face 114 and also contact the first shaft 812 to minimize the passage of any fluid through the end face 814 through the aperture 815 made for the first shaft 812. In some embodiments, the end face 814 may be a simple structure, and in other embodiments, such as the one shown, the end face 814 may incorporate multiple conventional structures.

Figure 9:
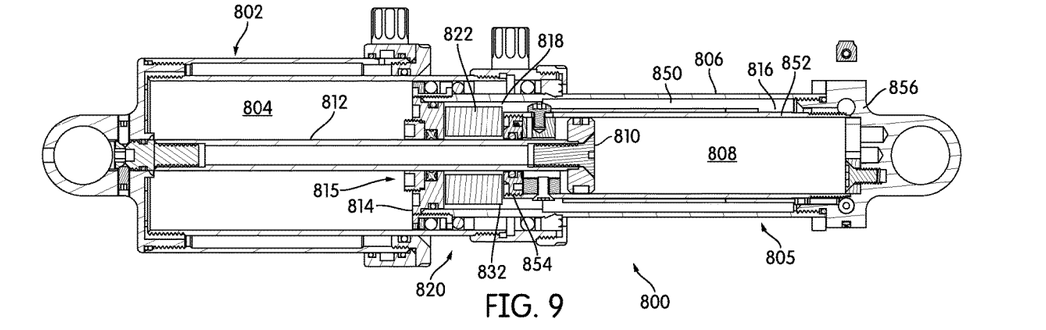
FIG. 9 is a sectional view of the shock absorber according to FIG. 8 taken along line 9-9 and showing the shock absorber in an extended position.
Figure 10:
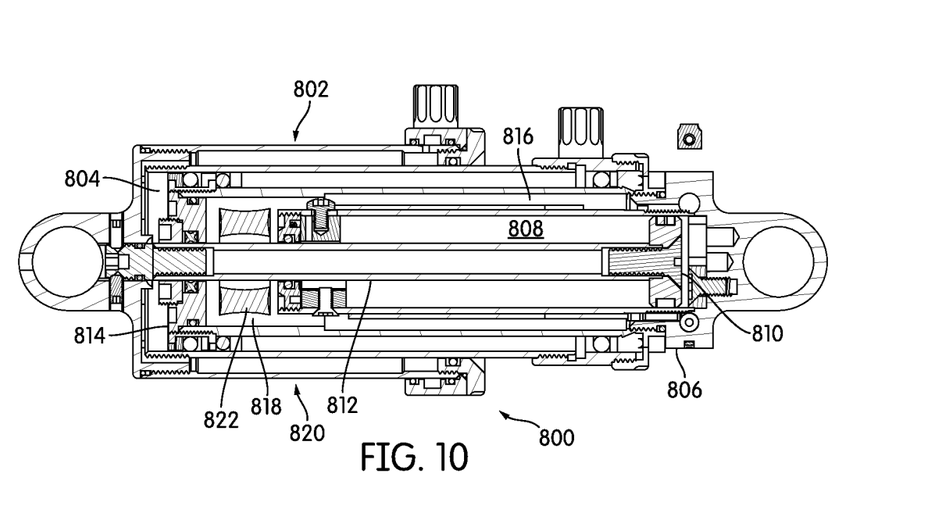
FIG. 10 is a sectional view of the shock absorber according to FIG. 8 taken along line 9-9 and showing the shock absorber in a compressed position.
Figure 11:
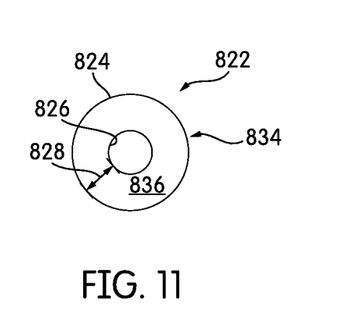
FIG. 11 is a top view of a second embodiment of a compensator.
Figure 12:
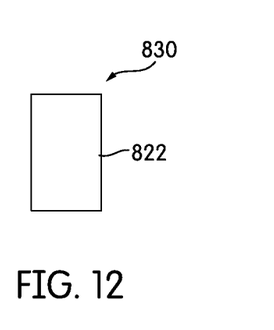
FIG. 12 is a side view of the embodiment of FIG. 11.
Figure 13:
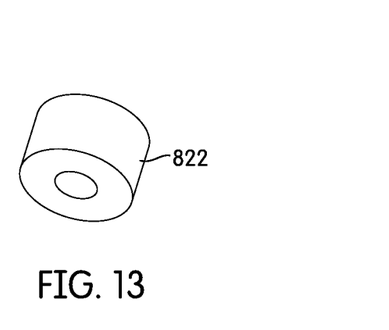
FIG. 13 is a perspective view of the embodiment of FIG. 11.
Figure 14:
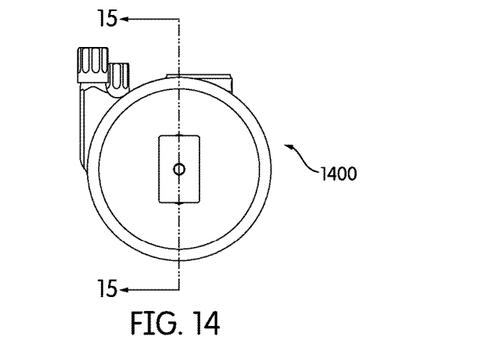
FIG. 14 is a top view of another embodiment of a shock absorber according to the disclosure.

A compensator 820 may be positioned in a compensator chamber 818 between the first piston 810 and the end face 814. The compensator 820 may be positioned within the shock absorber 800 without being secured to any other structures within the shock absorber 800. Accordingly, movement of the compensator 820 within the shock absorber 800 may be substantially independent of movement of the first piston 810, the end face 814, the first end 802 and the first tube 806.

The compensator 820 may also be substantially surrounded by the substantially incompressible fluid. In the embodiment of FIGS. 8-13, the compensator 820 may be an annular piece of foam 822 that may be filled with and may be configured to retain a compressible fluid. The annular foam 822 may be a resilient foam that is able to maintain the compressible fluid within the annular foam 822 separate from the substantially incompressible fluid in the compensator chamber 818 that substantially surrounds the annular foam 822. In the equilibrium position shown in FIG. 9, the relative pressure between the compressible fluid within the compensator 820 and the substantially incompressible fluid outside the compensator 820 results in an annular foam 822 that is substantially non-deformed. In other embodiments, there may be a preload applied in some manner, such that the compensator 820 is deformed due to a higher relative pressure of the compressible fluid. In many embodiments, it may be desirable for pressure of the substantially incompressible fluid to at least slightly deform the compensator 820 inwardly (to partially compress it towards a shape like that shown in FIG. 10). A designer will be able to select an appropriate foam from a variety of closed-cell foams, depending on the designer's criteria for density, durability, and length of use of the shock absorber. For ease of manufacturing and consistency of the compensation function, the annular foam 822 may be generally round on its outer circumference 824 and on its inner circumference 826 and may have a substantially continuous thickness 828 over the entire circumference. In many embodiments, the edges 830 of the annular foam 822 may be squared, so that the cross section of the annular bladder 822 shown in FIG. 9 is rectangular. In other embodiments, the edges can be rounded, the shape of the foam may be more irregular, or a plurality of smaller sections of foam may be used instead of the annular foam shown in the FIGS. In many embodiments, the annular foam 822 may be configured to at least partially or substantially surround the shaft 812 attached to the first end 802. A designer will be able to configure the foam and to determine an appropriate relative pressure of the compressible fluid within the foam and the pressure of the substantially incompressible fluid outside the foam to provide an appropriate level of compensation.

During compression and rebound strokes, the first piston 810 may move within the damping chamber 808. During the compression stroke, the first piston 810 may move into the damping chamber 808 (in a direction towards the right in the orientation of FIGS. 9 and 10). The position of the various parts of the shock absorber 800 in a fully compressed position may be best seen in FIG. 10. The substantially incompressible fluid may then flow through a valving system and into an annular passageway 816. The substantially incompressible fluid may then move into a compensator chamber 818 that may substantially surround the compensator 820. During the compression stroke, the pressure from the substantially incompressible fluid on the compensator 820 may cause the compensator 820 to change in shape and size. During the compression stroke, when the pressure of the substantially incompressible fluid on the outside 834 of the compensator 820 exceeds the pressure of the compressible fluid on the inside 836 of the compensator 820, the pressure of the substantially incompressible fluid may compress the compressible fluid on the inside of the compensator 820 and also deform the foam 822. In some embodiments, the compensator 820 may be configured to compress longitudinally upon an increase in pressure on the compensator 820 from the substantially incompressible fluid. In some embodiments, the compensator 820 may be configured to compress radially upon an increase in pressure on the compensator 820 from the substantially incompressible fluid. In some embodiments, the compensator 820 may be configured to compress longitudinally and radially upon an increase in pressure on the compensator 820 from the substantially incompressible fluid. One example of the configuration of the compensator 820 in a compressed form may be seen in FIG. 10. When the rebound stroke begins and the pressure on the compensator 820 decreases, the foam 822 may rebound to its original position.

The shock absorber 800 may further include a second tube 852 within the first tube 806. The second tube 852 may extend from one end cap 856 of the first tube 806 and may be substantially concentric with the first tube 806. The second tube 852 may terminate with a second tube end cap 854. The first piston 810 may be configured to reciprocate within the second tube 852 of the first tube 806.

The shock absorber 800 may also include a variable volume chamber 850 within the first tube 806. The variable volume chamber 850 may be at least partially defined by the end face 814, the first shaft 812, the second tube 852, and the compensator 820. The variable volume chamber 850 may include the annular chamber 816, the compensator chamber 818 and any other chambers that are in open fluid communication with either of those chambers. Because the compensator 820 may be positioned within and may help to define the volume of the variable volume chamber 850, and because the compensator 820 may be configured to be compressible when the incompressible fluid flows into the variable volume chamber 850 during a compression portion of the stroke, the effective volume of the variable volume chamber 850 may increase when the compensator 820 compresses. During the rebound portion of the stroke, the compensator 820 may return to an uncompressed configuration, thereby decreasing the effective volume of the variable volume chamber 850. Therefore, the effective volume of the variable volume chamber 850 may be variable.

In a third embodiment shown in FIGS. 14-20, a shock absorber 1400 may include a first end 1402 at least partially defining a gas chamber 1404. A second end 1405 may include a first tube 1406, which may at least partially define a damping chamber 1408. The first tube 1406 may be configured to telescopically interfit with the first end 1402. A first piston 1410 may secured in substantially fixed position to the first end 1402 with a first shaft 1412. The first piston 1410 may be configured to move within the first tube 1406. The second end 1405 may terminate in an end face 1414, and in some embodiments, such as the illustrated embodiment, where the first end 1402 includes a gas chamber 1404, the end face 1414 may be a second piston. The first shaft 1412 may pass through the end face 1414, and one or more seals may be incorporated in or around the end face 1414 and may also contact the first shaft 1412 through the aperture 1415 made for the first shaft 1412. In some embodiments, the end face 1414 may be a simple structure, and in other embodiments, such as the one shown, the end face 1414 may incorporate multiple conventional structures.

Figure 15:
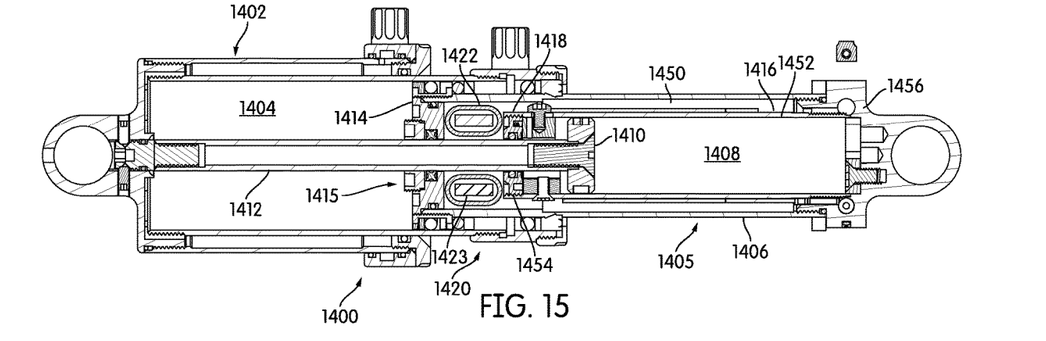
FIG. 15 is a sectional view of the shock absorber according to FIG. 14 taken along line 15-15 and showing the shock absorber in an extended position.
Figure 16:
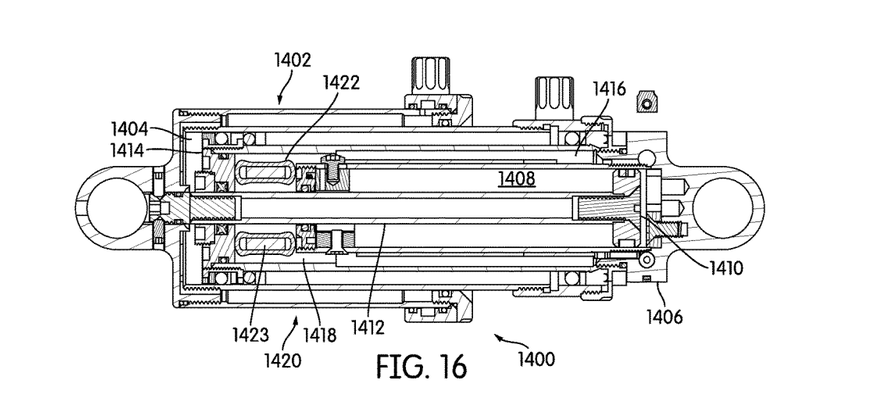
FIG. 16 is a sectional view of the shock absorber according to FIG. 14 taken along line 15-15 and showing the shock absorber in a compressed position.
Figure 17:
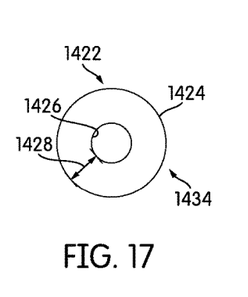
FIG. 17 is a top view of a first embodiment of a compensator.
Figure 18:
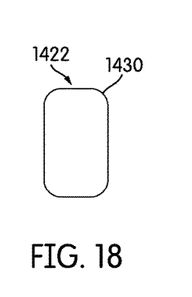
FIG. 18 is a side view of the embodiment of FIG. 17.
Figure 19:
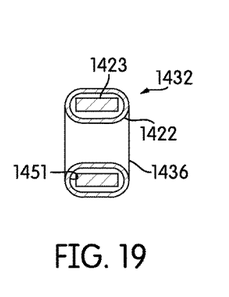
FIG. 19 is a sectional view of the embodiment of FIG. 17 taken along line 15-15 of FIG. 14.
Figure 20:
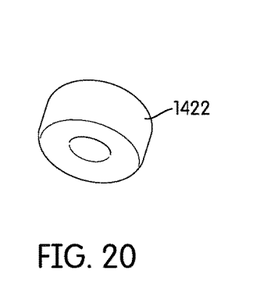
FIG. 20 is a perspective view of the embodiment of FIG. 17.

A compensator 1420 may be positioned in a compensator chamber 1418 between the first piston 1410 and the end face 1414. The compensator 1420 may be positioned within the shock absorber 1400 without being secured to any other structures within the shock absorber 1400. Accordingly, movement of the compensator 1420 within the shock absorber 1400 may be substantially independent of movement of the first piston 1410, the end face 1414, the first end 1402 and the first tube 1406.

The compensator 1420 may also be substantially surrounded by the substantially incompressible fluid. In the embodiment of FIGS. 14-20, the compensator 1420 may be an annular bladder that may be filled with and may be configured to retain compressible fluid, and is also at least partially filled with an annular foam piece. The annular bladder 1422 may be formed from rubber, polyurethane, or another resilient material that is able to maintain the compressible fluid within the annular bladder 1422 separate from the substantially incompressible fluid in the compensator chamber 1418 that substantially surrounds the annular bladder 1422. For ease of manufacturing and consistency of the compensation function, the annular bladder 1422 may be generally round on its outer circumference 1424 and on its inner circumference 1426 and may have a substantially continuous thickness 1428 over the entire circumference. In many embodiments, the edges 1430 of the annular bladder 1422 may be rounded, so that the cross section of the annular bladder 1422 shown in FIG. 16 is oval, as at 1432. In other embodiments, the edges can be squared off, the shape of the bladder may be more irregular, or a plurality of smaller bladders may be used instead of the annular bladder shown in the FIGS. In many embodiments, the annular bladder 1422 may be configured to at least partially or substantially surround the shaft 1412 attached to the first end 1402.

In the embodiment of FIGS. 14-20, the compensator 1420 may further include an annular piece of foam 1423 that is filled with and is configured to retain compressible fluid. The annular foam 1423 may be a resilient foam. A designer will be able to select an appropriate foam from a variety of closed-cell foams, depending on the designer's criteria for density, durability, and length of use of the shock absorber. For ease of manufacturing and consistency of the compensation function, the annular foam 1423 may be generally round on its outer circumference and on its inner circumference and may have a substantially continuous thickness over the entire circumference. In many embodiments, the edges of the annular foam 1423 may be squared, so that the cross section of the annular bladder 1423 shown in FIG. 15 is rectangular. In other embodiments, the edges can be rounded, the shape of the foam may be more irregular, or a plurality of smaller sections of foam may be used instead of the annular foam shown in the FIGS. In many embodiments, the annular foam 1423 may be configured to be the substantially the same size and shape as the cavity 1451 within the annular bladder 1422. In many embodiments, the annular foam 1423 may be configured to at least partially or substantially surround the shaft 1412 attached to the first end 1402.

In the equilibrium position shown in FIG. 15, the relative pressure between the compressible fluid within the compensator 1420 and the substantially incompressible fluid outside the compensator 1420 results in a bladder 1422 and an annular foam 1423 that are substantially non-deformed. In other embodiments, there may be a preload applied in some manner, such that the compensator 1420 is deformed due to a higher relative pressure of either the substantially incompressible fluid or the compressible fluid. In many embodiments, it may be desirable for pressure of the substantially incompressible fluid to at least slightly deform the compensator 1420 inwardly (to partially compress it towards a shape like that shown in FIG. 16). A designer will be able to configure the foam and the bladder and to determine an appropriate relative pressure of the compressible fluid within the foam and the pressure of the substantially incompressible fluid outside the foam to provide an appropriate level of compensation.

During compression and rebound strokes, the first piston 1410 may move within the damping chamber 1408. During the compression stroke, the first piston 1410 may move into the damping chamber 1408 (in a direction towards the right in the orientation of FIGS. 15 and 16). The position of the various parts of the shock absorber 1400 in a fully compressed position may be best seen in FIG. 16. The substantially incompressible fluid may then flow through a valving system and into an annular passageway 1416. The substantially incompressible fluid may then move into a compensator chamber 1418 that may substantially surround the compensator 1420. During the compression stroke, the pressure from the substantially incompressible fluid on the compensator 1420 may cause the compensator 1420 to change in shape and size. During the compression stroke, when the pressure of the substantially incompressible fluid on the outside 1434 of the bladder 1422 exceeds the pressure of the compressible fluid and the foam 1423 on the inside 1436 of the bladder 1422, the pressure of the substantially incompressible fluid may compress the compressible fluid and the foam 1423 on the inside of the bladder 1422 and also deform the bladder 1422. In some embodiments, at least one portion of the compensator 1420 may configured to compress longitudinally upon an increase in pressure on the compensator 1420 from the substantially incompressible fluid. In some embodiments, at least one portion of the compensator 1420 may be configured to compress radially upon an increase in pressure on the compensator 1420 from the substantially incompressible fluid. In some embodiments, the compensator 1420 may be configured to compress longitudinally and radially upon an increase in pressure on the compensator 1420 from the substantially incompressible fluid. One example of the configuration of the compensator 1420 in a compressed form may be seen in FIG. 16. When the rebound stroke begins and the pressure on the compensator 1420 decreases, the bladder 1422 and the foam 1423 may rebound to their original positions. In some embodiments, pressure from the compressible fluid within the bladder 1422 may outwardly deform the bladder 1422 radially, longitudinally, or both, to minimize cavitation and maintain an appropriate pressure within the damping chamber 1408.

The shock absorber 1400 may further include a second tube 1452 within the first tube 1406. The second tube 1452 may extend from one end cap 1456 of the first tube 1406 and may be substantially concentric with the first tube 1406. The second tube 1452 may terminate with a second tube end cap 1454. The first piston 1410 may be configured to reciprocate within the second tube 1454 of the first tube 1406.

The shock absorber 1400 may also include a variable volume chamber 1450 within the second tube 1406. The variable volume chamber 1450 may be at least partially defined by the end face 1414, the first shaft 1412, the second tube 1452, and the compensator 1420. The variable volume chamber 1450 may include the annular chamber 1416, the compensator chamber 1418 and any other chambers that are in open fluid communication with either of those chambers. Because the compensator 1420 may be positioned within and may help to define the volume of the variable volume chamber 1450, and because the compensator 1420 may be configured to be compressible, when the incompressible fluid flows into the variable volume chamber 1450 during a compression portion of the stroke, the effective volume of the variable volume chamber 1450 may increase when the compensator 1420 compresses. During the rebound portion of the stroke, the compensator 1420 may return to an uncompressed configuration or may temporarily expand to have an increased volume, thereby decreasing the effective volume of the variable volume chamber 1450. Therefore, the effective volume of the variable volume chamber 1450 is variable.

In the embodiments disclosed in FIGS. 1-20, the shock absorbers were shown as including a gas spring chamber. However, the shock absorber could use any other conventional spring configuration, if desired.

Figure 21:
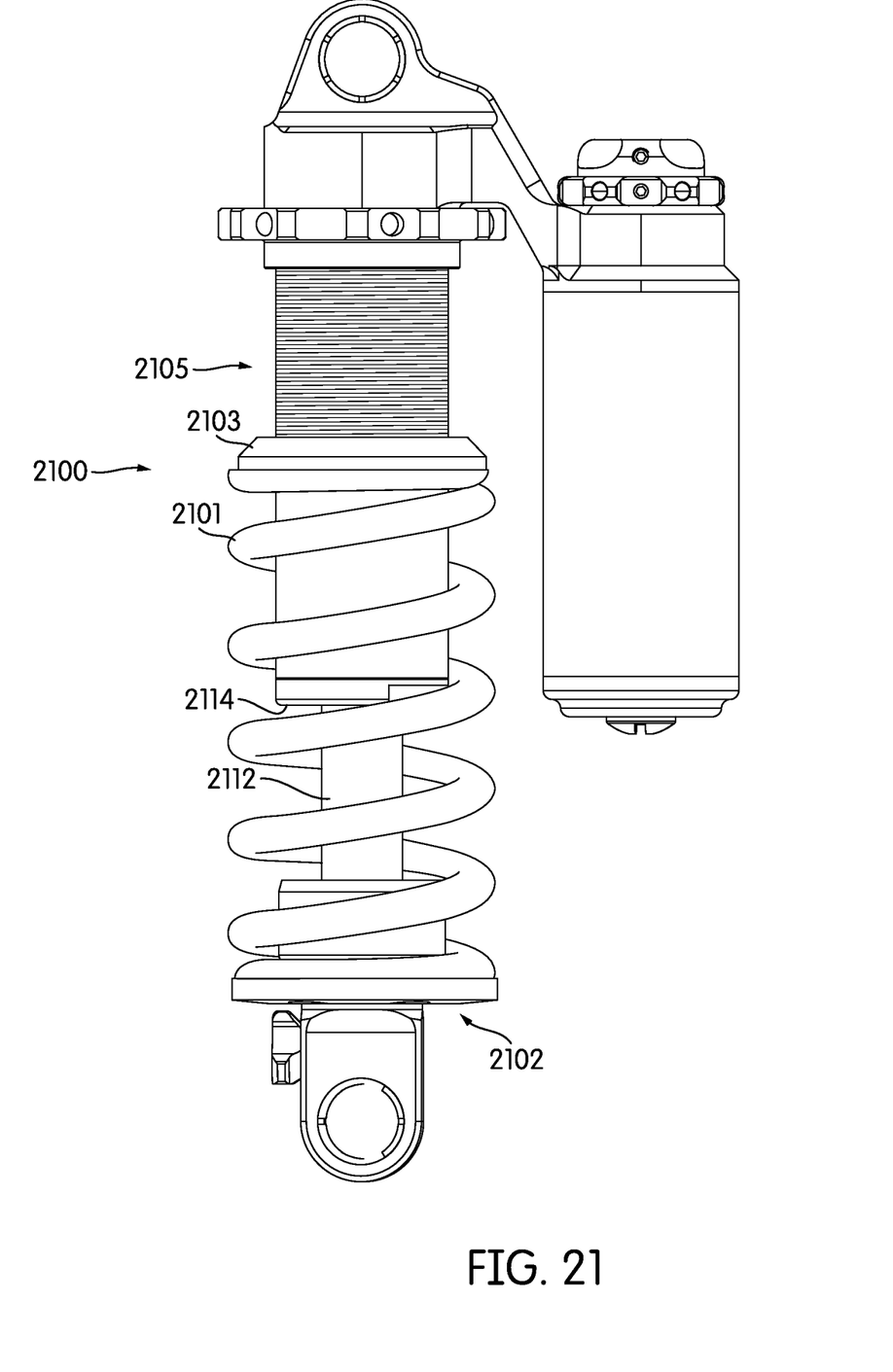
FIG. 21 is a front view of another embodiment of a shock absorber according to the disclosure.

FIG. 21 shows an alternative configuration of the spring. The shock absorber 2100 may include a first end 2102 and a second end 2105. A first shaft 2112 may be attached to the first end 2102. The first end 2102 and the second end 2105 may be configured to reciprocate with respect to one another during a compression stroke. In the embodiment of FIG. 21, the internal features of the second end 2105 may be substantially the same as shown in any of the previous embodiments. However, no gas spring chamber is included. Instead, a coil spring 2101 may be secured or attached to the first end 2102 and may either be attached to the second end 2105 or simply press against a flange 2103 attached to the second end 2105. In another embodiment, the spring 2101 may be attached to only the second end 2105. In this illustrated embodiment, the end face 2114 of the second end 2105 does not act as a piston within a gas spring chamber, but instead is simply an exposed end. A designer will be able to make the appropriate changes to the shapes and sizes of the various parts within the second end 2105 to accommodate the differences in how the alternative spring resists compression without undue experimentation, as this type of conversion is known in the industry.

Figure 22:
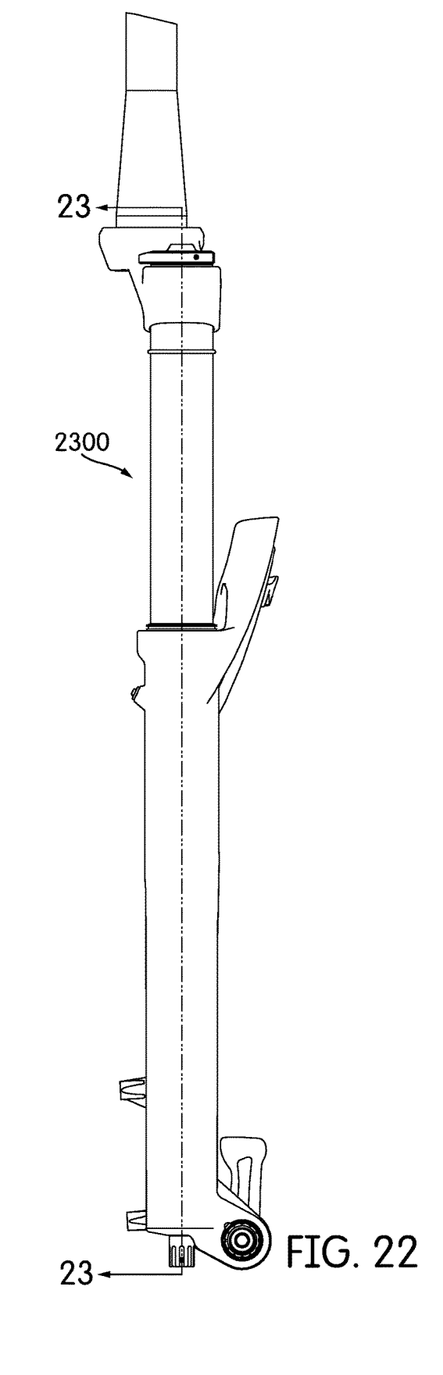
FIG. 22 is a side view of another embodiment of a shock absorber according to the disclosure.
Figure 23:
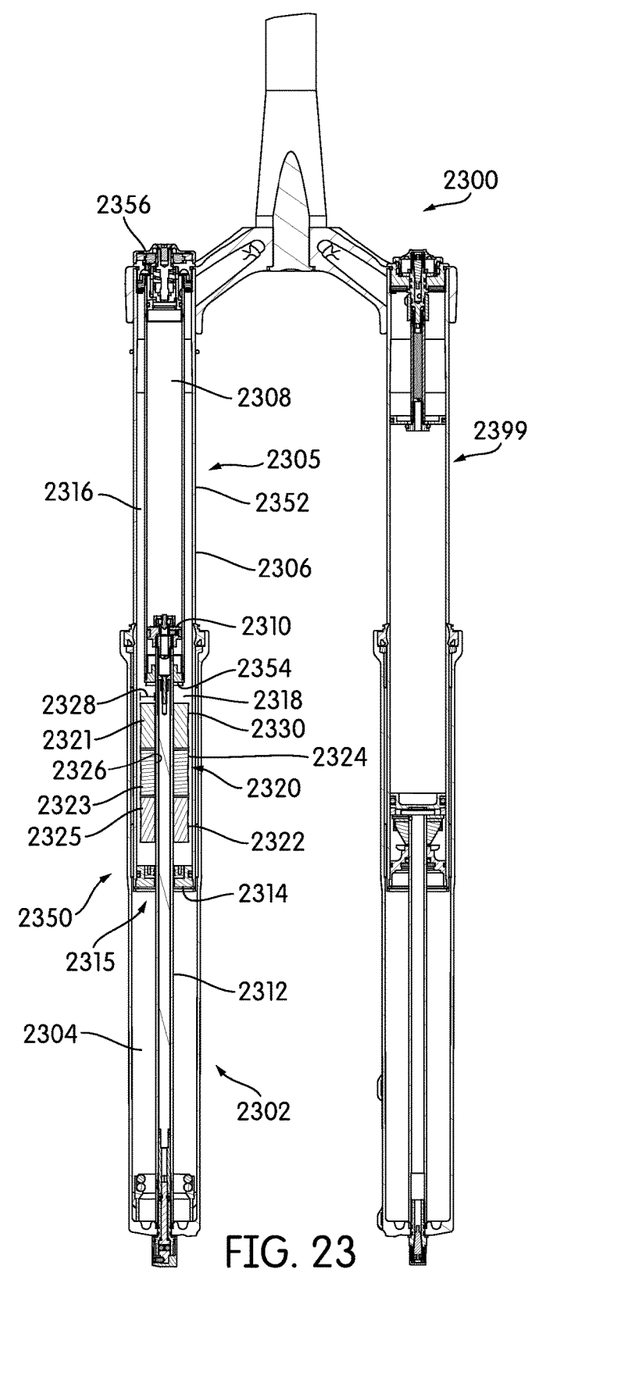
FIG. 23 is a cross-sectional view of the embodiment of FIG. 22 taken along line 23-23.

The embodiments of FIGS. 1-21 are of the invention as incorporated into a rear shock. However, the invention may also be incorporated into at least one leg of a front fork. Other, conventional structures may be incorporated into the other leg of the front fork, as shown in the other leg 2399 in FIG. 23. This embodiment is shown in FIGS. 22-23. The embodiment illustrated in FIGS. 22 and 23 is most analogous to the rear shock embodiment in the configuration shown in FIGS. 8-13. The front fork is shown only in an expanded configuration, and the compensator is not illustrated separately from the remainder of the structure. A designer will be able to understand that the overall, general function and shape of the parts is substantially the same as that shown and disclosed in greater detail in FIGS. 8-13 without the need for drawings showing similar details for the front fork embodiment.

In the embodiment of FIGS. 22-23, a shock absorber 2300 may include a first end 2302 at least partially defining a gas chamber 2304, which may be a gas spring chamber as illustrated. A second end 2305 may comprise a first tube 2306 that may at least partially define a damping chamber 2308. The first tube 2306 may be configured to telescopically interfit with the first end 2302. A first piston 2310 may secured in substantially fixed position to the first end 2302 with a first shaft 2312. The first piston 2310 may be configured to move within the first tube 2306. The second end 2305 may terminate in an end face 2314, and in some embodiments, such as the illustrated embodiment, where the first end 2302 includes a gas chamber 2304, the end face 2314 may be a second piston. The first shaft 2312 may pass through the end face 2314, and one or more seals may be incorporated in or around the end face 2314 and may also contact the first shaft 2312 through the aperture 2315 made for the first shaft 2312. In some embodiments, the end face 2314 may be a simple structure, and in other embodiments, such as the one shown, the end face 2314 may incorporate multiple conventional structures.

A compensator 2320 may be positioned in a compensator chamber 2318 between the first piston 2310 and the end face 2314. The compensator 2320 may be positioned within the shock absorber 2300 without being secured to any other structures within the shock absorber 2300. Accordingly, movement of the compensator 2320 within the shock absorber 2300 may be substantially independent of movement of the first piston 2310, the end face 2314, the first end 2302 and the first tube 2306.

The compensator 2320 may also be substantially surrounded by the substantially incompressible fluid. In the embodiment of FIG. 2320, the compensator 2320 may be an annular piece of foam 2322 that may be filled with and may be configured to retain compressible fluid. The annular foam 2322 may be a resilient foam that is able to maintain the compressible fluid within the annular foam 2322 separate from the substantially incompressible fluid in the compensator chamber 2318 that substantially surrounds the annular foam 2322. In the equilibrium position shown in FIG. 23, the relative pressure between the compressible fluid within the compensator 2320 and the substantially incompressible fluid outside the compensator 2320 results in an annular foam 2322 that is substantially non-deformed. In other embodiments, there may be a preload applied in some manner, such that the compensator 2320 is deformed due to a higher relative pressure of either the substantially incompressible fluid or the compressible fluid. In many embodiments, it may be desirable for pressure of the substantially incompressible fluid to at least slightly deform the compensator 2320 inwardly or to partially compress it. A designer will be able to select an appropriate foam from a variety of closed-cell foams, depending on the designer's criteria for density, durability, and length of use of the shock absorber. For ease of manufacturing and consistency of the compensation function, the annular foam 2322 may be generally round on its outer circumference 2324 and on its inner circumference 2326 and may have a substantially continuous thickness 2328 over the entire circumference. In many embodiments, the edges 2330 of the annular foam 2322 may be squared, so that the cross section of the annular bladder 2322 rectangular. In other embodiments, the edges can be rounded, the shape of the foam may be more irregular. In many embodiments, the annular foam 2322 may be configured to at least partially or substantially surround the shaft 2312 attached to the first end 2302. A designer will be able to configure the foam and to determine an appropriate relative pressure of the compressible fluid within the foam and the pressure of the substantially incompressible fluid outside the foam to provide an appropriate level of compensation.

The embodiment of FIG. 23 differs from the embodiment of FIG. 9 in that the length of travel of the shock absorber 2300 is significantly longer than the embodiment of FIG. 9. That is because the typical distance between the bicycle frame (not shown) and the bicycle wheel (not shown) for a front fork is significantly longer than the same gap for a rear shock. Accordingly, in some front fork embodiments, it may be desirable for the compensator 2320 to be made of more than one section of foam 2322. In the embodiment illustrated in FIG. 23, the compensator 2320 includes a first foam 2321, a second foam 2323, and a third foam 2325. In some embodiments, the first foam 2321, the second foam 2323 and the third foam 2325 may be different foams with different compression characteristics. If different foams are used, the ride characteristics will be different from the use of a compensator 2320 that uses multiple segments of the same foam. A designer may choose to use a stacked set of the same foam to improve manufacturability, for example because tolerances may be easier to manage if a thin foam is cut, rather than a thick foam. A person having ordinary skill in the art can determine what foam should be used in any desired configuration to permit the desired level of compensation for a shock absorber.

During compression and rebound strokes, the first piston 2310 may move within the damping chamber 2308. During the compression stroke, the first piston 2310 may move into the damping chamber 2308 (in an upward direction in the orientation of FIG. 23). The substantially incompressible fluid may then flow through a valving system and into an annular passageway 2316. The substantially incompressible fluid may then move into a compensator chamber 2318 that may substantially surround the compensator 2320. During the compression stroke, the pressure from the substantially incompressible fluid on the compensator 2320 may cause the compensator 2320 to change in shape and size. During the compression stroke, when the pressure of the substantially incompressible fluid on the outside of the compensator 2320 exceeds the pressure of the compressible fluid on the inside of the compensator 2320, the pressure of the substantially incompressible fluid may compress the compressible fluid on the inside of the compensator 2320 and also deform the foam 2322. In some embodiments, the compensator 2320 may be configured to compress longitudinally upon an increase in pressure on the compensator 2320 from the substantially incompressible fluid. In some embodiments, the compensator 2320 may be configured to compress radially upon an increase in pressure on the compensator 2320 from the substantially incompressible fluid. In some embodiments, the compensator 2320 may be configured to compress longitudinally and radially upon an increase in pressure on the compensator 2320 from the substantially incompressible fluid. When the rebound stroke begins and the pressure on the compensator 2320 decreases, the foam 2322 may rebound to its original position.

The embodiment of FIG. 23 illustrates the use of a foam compensator 2320. However, a front fork embodiment need not be limited to only a foam compensator. Instead, the compensator used in the front fork could use one or a series of annular bladders filled with a compressible fluid or one or a set of annular bladders that are at least partially filled with a foam, and further filled with a compressible fluid. A person having ordinary skill in the art is able to use the disclosure of the other embodiments of this disclosure to modify the front fork design of FIG. 23 to accommodate another style of compensator.

The shock absorber 2300 may further include a second tube 2352 within the first tube 2306. The second tube 2352 may extend from one end cap 2356 of the first tube 2306 and may be substantially concentric with the first tube 2306. The second tube 2352 may terminate with a second tube end cap 2354. The first piston 2310 may be configured to reciprocate within the second tube 2352 of the first tube 2306.

The shock absorber 2300 may also include a variable volume chamber 2350 within the first tube 2306. The variable volume chamber 2350 may be at least partially defined by the end face 2314, the first shaft 2312, the second tube 2352, and the compensator 2320. The variable volume chamber 2350 may include the annular chamber 2316, the compensator chamber 2318 and any other chambers that are in open fluid communication with either of those chambers. Because the compensator 2320 may be positioned within and may help to define the volume of the variable volume chamber 2350, and because the compensator 2320 may be configured to be compressible when the incompressible fluid flows into the variable volume chamber 2350 during a compression portion of the stroke, the effective volume of the variable volume chamber 2350 may increase when the compensator 2320 compresses. During the rebound portion of the stroke, the compensator 2320 may return to an uncompressed configuration, thereby decreasing the effective volume of the variable volume chamber 2350. Therefore, the effective volume of the variable volume chamber 2350 may be variable.

Figure 24:
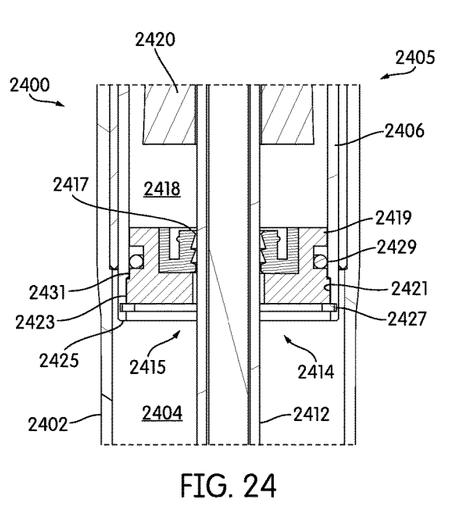
FIG. 24 is a cross-sectional view of an alternative embodiment of an end face.
Figure 25:
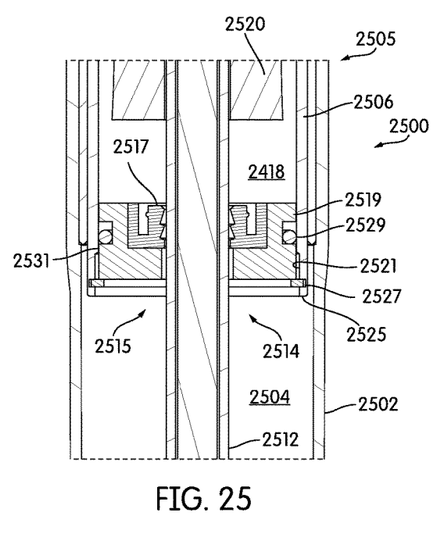
FIG. 25 is a cross-sectional view of another alternative embodiment of an end face.

FIGS. 24 and 25 illustrate in greater detail additional embodiments of the end face of the second end. These embodiments of end faces are most desirable when the end face also functions as a second piston. These embodiments are illustrated as being consistent with the embodiments described above in FIGS. 22 and 23. However, these embodiments could be used with any of the illustrated embodiments.

In the embodiment of FIG. 24, a shock absorber 2400 may include a first end 2402 at least partially defining a gas chamber 2404, which may be a gas spring chamber as illustrated. A second end 2405 may comprise a first tube 2406 that may be configured to telescopically interfit with the first end 2402. A first piston (not shown) may secured in substantially fixed position to the first end 2402 with a first shaft 2412. The second end 2405 may terminate in an end face 2414, and in some embodiments, such as the illustrated embodiment, where the first end 2402 includes a gas chamber 2404, the end face 2414 may be a second piston. The first shaft 2412 may pass through the end face 2414, and one or more seals 2417 may be incorporated in or around the end face 2414 and may also contact the first shaft 2412 through the aperture 2415 made for the first shaft 2412. Additional seals 2429 may be incorporated in or around the end face 2414 and may also contact the other portion of the second end 2405. A compensator 2420 may be positioned in a compensator chamber 2418 between the first piston (not shown) and the end face 2414.

In the embodiment of FIG. 24, the end face 2414 may include a piston 2419 that may include a shoulder 2423 that may fit within a recess 2421 near the free end 2425 of the second end 2405. The end face 2414 may further include a fastener 2427, such as the illustrated circlip, that may be configured to impinge on the piston 2419 and restrict movement of the piston 2419. Because of the tolerances involved in manufacturing and the materials conventionally used in manufacturing these types of products, it will be understood by a designer that at least one portion of the end face 2414 may be configured to and able to move relative to the remainder of the second end 2405, particularly during a compression stroke when the pressure in the gas spring chamber 2404 and the pressure in the compensator chamber 2418 may increase at different rates.

In the embodiment of FIG. 25, a shock absorber 2500 may include a first end 2502 at least partially defining a gas chamber 2504, which may be a gas spring chamber as illustrated. A second end 2505 may comprise a first tube 2506 that may be configured to telescopically interfit with the first end 2502. A first piston (not shown) may secured in substantially fixed position to the first end 2502 with a first shaft 2512. The second end 2505 may terminate in an end face 2514, and in some embodiments, such as the illustrated embodiment, where the first end 2502 includes a gas chamber 2504, the end face 2514 may be a second piston. The first shaft 2512 may pass through the end face 2514, and one or more seals 2517 may be incorporated in or around the end face 2514 and may also contact the first shaft 2512 through the aperture 2515 made for the first shaft 2512. Additional seals 2529 may be incorporated in or around the end face 2514 and may also contact the other portion of the second end 2505. A compensator 2520 may be positioned in a compensator chamber 2518 between the first piston (not shown) and the end face 2514.

In the embodiment of FIG. 25, the free end 2525 of the second end 2505 may include a recess 2521. However, the recess 2521 may be optional where, as in this embodiment, the design does not include a shoulder to be retained in the recess. The end face 2514 may further include a fastener 2527, such as the illustrated circlip, that may be configured to impinge on the piston 2519 and restrict movement of the piston 2519 out of the second end 2505 and into the gas chamber 2504. However, because this embodiment of the piston 2519 lacks the shoulder that fits in the recess of the second end, the piston 2519 may be able to float or move relative to the shaft 2512 to equalize, tune, or otherwise reduce or minimize the difference in pressure within the gas spring chamber 2504 and the compensator chamber 2518. Accordingly, it will be understood by a designer that at least one portion of the end face 2514 may be configured to and able to move relative to the remainder of the second end 2505, particularly during a compression stroke when the pressure in the gas spring chamber 2504 and the pressure in the compensator chamber 2518 may increase at different rates.

In the disclosed embodiments, structures and apertures of various sizes and shapes were illustrated. The precise configurations of these items are shown in an illustrative fashion only. A designer can easily change the shape, size, material, number or other features of these items to achieve a particular characteristic that the designer may deem particularly desirable or helpful. These modifications are well within the knowledge of a designer having ordinary skill in the art. In addition, various embodiments may have disclosed a particular modification to a primary embodiment. A design will be able to easily understand how to incorporate multiple changes to the design as disclosed and will also understand which changes cannot be incorporated in the same structure. A designer can do these substitutions without undue experimentation.

This detailed description in connection with the drawings is intended principally as a description of the presently preferred embodiments of the invention and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of any claims.

The invention claimed is:

1. A shock absorber, comprising:
   a first end configured to be mounted to a bicycle and at least partially defining a first chamber;
   a second end telescopically interfitting with the first end and configured to be mounted to a bicycle and comprising a first tube at least partially defining a damping chamber, the second end terminating in an end face;
   wherein fluid in the first chamber is separated from fluid in the damping chamber;
   a first piston secured in substantially fixed position to the first end with a first shaft, the first piston configured to move within the second end; and
   a compensator positioned between the first piston and the end face;
   wherein movement of the compensator is substantially independent of movement of the first piston, the first end and the first tube;
   wherein the compensator is substantially surrounded by a substantially incompressible fluid and is configured to retain a compressible fluid; and
   wherein the compensator at least partially surrounds the first shaft.

2. The shock absorber according to claim 1, wherein the compensator comprises an annular bladder.

3. The shock absorber according to claim 2, wherein the compensator comprises at least one foam capable of retaining the compressible fluid.

4. The shock absorber according to claim 1, wherein the compensator comprises at least one foam capable of retaining the compressible fluid.

5. The shock absorber according to claim 1, wherein at least one portion of the compensator is configured to compress upon an increase in pressure on the compensator from the substantially incompressible fluid.

6. The shock absorber according to claim 1, wherein at least one portion of the end face is configured to move relative to the remainder of the second end.

7. The shock absorber according to claim 1, the compensator further comprising a spring attached to the first end.

8. The shock absorber according to claim 1, wherein the first chamber is a gas chamber and the fluid in the first chamber is a gas.

9. The shock absorber according to claim 1, wherein the first shaft and the compensator are configured to move relative to one another.

10. A shock absorber, comprising:
a first end configured to be mounted to a bicycle and at least partially defining a first chamber;
a second end telescopically interfitting with the first end and configured to be mounted to a bicycle and comprising a first tube at least partially defining a damping chamber, the second end terminating in an end face;
wherein fluid in the first chamber is separated from an incompressible fluid in the damping chamber;
a first piston secured in substantially fixed position to the first end with a first shaft, the first piston configured to move within the first tube;
a second tube positioned within the first tube; and
a variable volume chamber within the first tube and at least partially defined by the end face, the first shaft, and the second tube, wherein an effective volume of the variable volume chamber is variable.

11. A shock absorber according to claim 10, further comprising a compensator positioned within the variable volume chamber.

12. The shock absorber according to claim 11, wherein the compensator comprises an annular bladder.

13. The shock absorber according to claim 11, wherein the compensator comprises at least one foam capable of retaining a compressible fluid.

14. The shock absorber according to claim 11, where variability of the volume of the variable volume chamber is substantially defined by variability in the volume of the compensator.

15. The shock absorber according to claim 14, wherein at least one portion of the compensator is configured to compress longitudinally upon an increase in pressure on the compensator.

16. The shock absorber according to claim 14, wherein at least one portion of the compensator is configured to compress radially upon an increase in pressure on the compensator.

17. The shock absorber according to claim 11, wherein the compensator is configured to move substantially independently of the first end, the first tube, and the first piston.

18. The shock absorber according to claim 11, wherein the compensator substantially surrounds the first shaft.

19. The shock absorber according to claim 18, wherein the compensator and the first shaft are configured to move relative to one another.

20. The shock absorber according to claim 10, wherein at least one portion of the end face is configured to move relative to the remainder of the second end.

* * * * *